(12) United States Patent
Hwang et al.

(10) Patent No.: US 12,630,456 B2
(45) Date of Patent: May 19, 2026

(54) METHOD OF MANUFACTURING SAPPHIRE COVER WINDOW AND SAPPHIRE COVER WINDOW MANUFACTURED THEREBY

(71) Applicant: UTI INC., Yesan-gun (KR)

(72) Inventors: Jae Young Hwang, Yesan-gun (KR); Hak Chul Kim, Yesan-gun (KR); Hyunho Kim, Yesan-gun (KR); Yong Bae Na, Yesan-gun (KR)

(73) Assignee: UTI INC, Yesan-gun (KR)

( * ) Notice: Subject to any disclaimer, the term of this patent is extended or adjusted under 35 U.S.C. 154(b) by 337 days.

(21) Appl. No.: 18/365,093

(22) Filed: Aug. 3, 2023

(65) Prior Publication Data

US 2024/0067555 A1     Feb. 29, 2024

(30) Foreign Application Priority Data

Aug. 22, 2022    (KR) ........................ 10-2022-0104573
Sep. 20, 2022    (KR) ........................ 10-2022-0118298

(51) Int. Cl.
| | |
|---|---|
| *C03B 33/02* | (2006.01) |
| *B23K 26/0622* | (2014.01) |
| *B23K 26/364* | (2014.01) |
| *B23K 26/402* | (2014.01) |
| *C03B 33/04* | (2006.01) |

(Continued)

(52) U.S. Cl.
CPC ...... C03B 33/0222 (2013.01); B23K 26/0624 (2015.10); B23K 26/364 (2015.10); B23K 26/402 (2013.01); C03B 33/04 (2013.01); C03C 15/00 (2013.01); B23K 2103/52 (2018.08)

(58) Field of Classification Search
CPC ......... C03C 15/00; C03B 33/04; B23K 26/53;

B23K 26/0624; B23K 26/359; B23K 26/364; B23K 26/386; B23K 2103/54; B23K 2103/52; B23K 26/402

See application file for complete search history.

(56) References Cited

U.S. PATENT DOCUMENTS

| | | | | |
|---|---|---|---|---|
| 2014/0030443 A1* | 1/2014 | Prest | ........................ | B41M 5/24 |
| | | | | 427/256 |
| 2017/0001266 A1* | 1/2017 | Li | ........................ | B23K 26/361 |
| 2019/0119150 A1* | 4/2019 | Burket | ................ | C03C 23/0025 |

FOREIGN PATENT DOCUMENTS

| | | |
|---|---|---|
| JP | 2004-160618 A | 6/2004 |
| JP | 2015-524379 A | 8/2015 |
| KR | 10-2012-0102896 A | 9/2012 |

OTHER PUBLICATIONS

"Mechanisms of damage formation in glass in the process of femtosecond laser drilling", Yusuki et al., Applied Physics A, Materials Science and Processing, Aug. 19, 2025, Year 2018 (Year: 2018).*

(Continued)

*Primary Examiner* — Alison L Hindenlang
*Assistant Examiner* — Christopher Paul Daigler
(74) *Attorney, Agent, or Firm* — Stein IP, LLC

(57)     ABSTRACT

Proposed are a method of manufacturing a sapphire cover window, which includes: preparing a sapphire wafer; forming a cell edge processing portion on the sapphire wafer with a laser beam; forming an etched portion on the sapphire wafer by selectively performing wet etching on the cell edge processing portion; and separating a cell from the sapphire wafer by compressing the sapphire wafer on which the etched portion are formed, and a sapphire cover window manufactured thereby.

12 Claims, 16 Drawing Sheets

(51) Int. Cl.
    *C03C 15/00*       (2006.01)
    *B23K 103/00*     (2006.01)

(56)             References Cited

OTHER PUBLICATIONS

"Etching of Glass Solid State Nuclear Track Detectors in Aqueous Solutions of (NH4) HF2, NaOH and KOH" Khan et. al., International Journal of Applied Radiation and Isotopes, vol. 29, pp. 229-232, Pergamon Press Limited , Received Oct. 10, 1977 , Aug. 27, 2025, Year 1978 (Year: 1978).*
Occidental Caustic Soda Handbook (https://www.oxy.com/products/chlor-alkali. p. 33 Graph 1 , Aug. 28, 2025.*
Occidental Caustic Potash Handbook (https://www.oxy.com/products/koh. p. 34 Graph 2 , Aug. 28, 2025.*

* cited by examiner

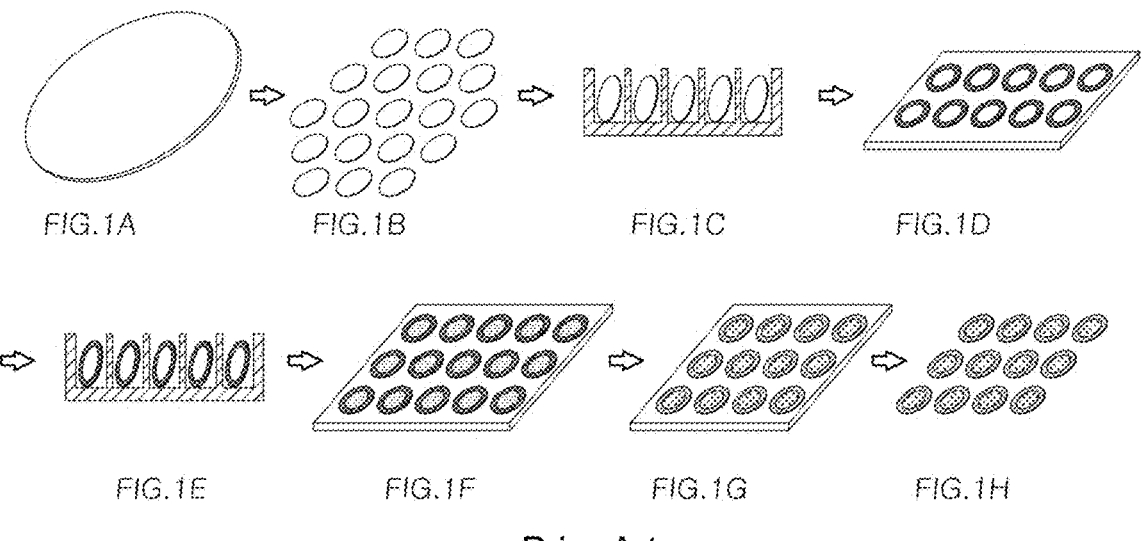
FIG.1A    FIG.1B    FIG.1C    FIG.1D
FIG.1E    FIG.1F    FIG.1G    FIG.1H
Prior Art
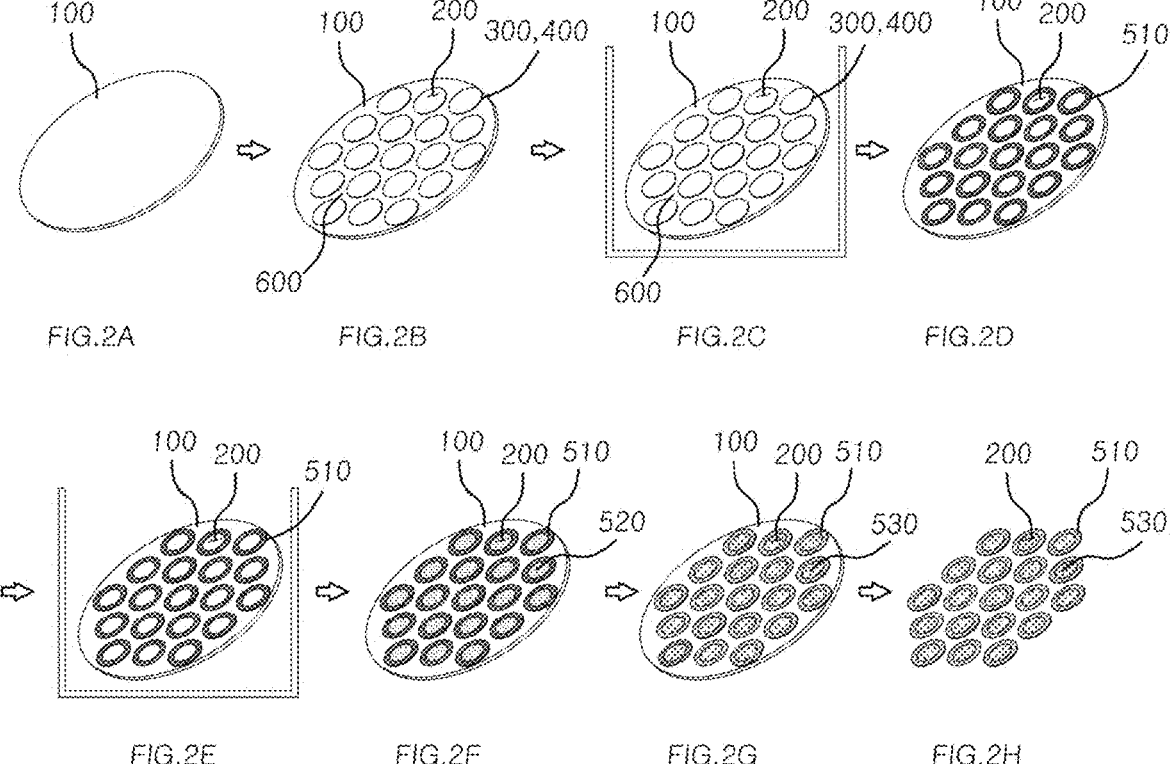
FIG.2A    FIG.2B    FIG.2C    FIG.2D
FIG.2E    FIG.2F    FIG.2G    FIG.2H

| CLASSIFICATION | MAGNIFICATION | ETCHING FOR 2 HOURS | ETCHING FOR 4 HOURS | ETCHING FOR 8 HOURS |
|---|---|---|---|---|
| UPPER PORTION OF SIDE SURFACE | x500 | | | |
| | x1,000 | | | |
| | x2,000 | | | |

METHOD OF MANUFACTURING SAPPHIRE COVER WINDOW AND SAPPHIRE COVER WINDOW MANUFACTURED THEREBY

CROSS REFERENCE TO RELATED APPLICATION

The present application claims priority to Korean Patent Application Nos. 10-2022-0104573, filed Aug. 22, 2022 and 10-2022-0118298, filed Sep. 20, 2022, the entire contents of which are incorporated herein for all purposes by this reference.

BACKGROUND OF THE DISCLOSURE

1. Field of the Disclosure

The present disclosure relates to a method of manufacturing a cover window and a cover window manufactured thereby. More particularly, the present disclosure relates to a method of manufacturing a sapphire cover window in which a process is performed at a wafer level and to a sapphire cover window manufactured thereby.

2. Description of the Related Art

A cover window is typically attached to the front surface of a display or camera module to protect a display panel, a camera module, or the like.

Cover windows essentially need to be highly transparent, durable, and scratch-resistant, so glass-based cover windows using tempered glass have been widely used.

As high-performance camera modules are provided with expensive mobile phones, demand for better durability and scratch resistance is growing. For this purpose, research has been conducted on cover windows using sapphire.

Sapphire has a higher surface hardness than tempered glass and is known to be physically and chemically stable, thereby being usefully applicable to cover windows for camera modules.

Due to a characteristic of high surface hardness, such sapphire undergoes a cutting process using a diamond wheel or with a laser beam to be processed into a predetermined form.

In an existing process of manufacturing a cover window, a cell process of cutting a sapphire wafer into unit cells and then performing a subsequent process (a formation process of a printed layer or the like) at the unit cell level is performed.

FIGS. 1A, 1B, 1C, 1D, 1E, 1F, 1G, and 1H illustrate schematic diagrams of an existing cell process for manufacturing a camera cover window, in which the process includes: first preparing a sapphire wafer (FIG. 1A), cutting the sapphire wafer into unit cells (FIG. 1B), performing a primary cleaning process by replacing the cells in a cleaning jig (FIG. 10), performing a printing process by replacing the cells in a printing jig (FIG. 1D), performing a secondary cleaning process by replacing the cells once again in the cleaning jig (FIG. 1E), performing an AR coating process and an AF coating process by replacing the cells in an anti-reflective (AR) coating jig (FIG. 1F) and an anti-fingerprint (AF) coating jig on the opposite surface (FIG. 1G), respectively; and lastly separating the final cells (FIG. 1H).

In other words, in the existing cell process, the unit cell is formed by completely cutting the wafer along the cell edge using a diamond wheel or with a laser beam, removing a dummy, and then performing the subsequent process.

In the case of manufacturing a camera cover window, as illustrated in FIGS. 1A, 1B, 1C, 1D, 1E, 1F, 1G, and 1H, different types of jigs are required to be continuously used while changing the direction of the cell due to the characteristics of each process.

For example, both surfaces of the cell need to be cleaned during the cleaning process, a printed layer is formed on the rear surface (back surface) of the cell during the printing process, and an AR coating layer is formed on the rear surface (back surface) or both surfaces of the cell during the AR coating process. In this case, the jig needs to be designed to have a structure such that the cells are not detached due to the dead weight thereof because the cells are attached to the ceiling of a vacuum evaporator. In addition, since an AF coating layer needs to be formed on the front surface of the cell during the AF coating process, the jigs for each process are incompatible.

When the jigs are incompatible, as described above, handling is frequently required to insert and remove the cells to and from the jig whenever each process starts and ends, resulting in extremely low efficiency.

In addition, even during the unit cell-level process of performing the printing process, the AR coating process, and the AF coating process, it is highly likely that the quality between cells varies or a process defect rate increases.

In particular, in the case of small cells having a size smaller than 30 mm or less, cell handling is not easy compared to the case of cells having a large size. Therefore, the jigs described above are necessary for use. For this purpose, a process of loading the cells onto the jig one by one and unloading the same from the jig is necessarily repeated.

The problems described above become further noticeable in such small cells. In addition, yield reduction and defect rates further increase, and production costs thus are rapidly increased.

SUMMARY OF THE INVENTION

The present disclosure has been derived from the above needs. An objective of the present disclosure is to provide a method of manufacturing a sapphire cover window in which a cell manufacturing process using a sapphire wafer is performed at a wafer level, and a sapphire cover window manufactured thereby.

To accomplish the objective of the present disclosure, the present disclosure relates to a method of manufacturing a sapphire cover window, which includes: preparing a sapphire wafer; forming a cell edge processing portion on the sapphire wafer with a laser beam; forming an etched portion on the sapphire wafer by selectively performing wet etching on the cell edge processing portion; and separating a cell from the sapphire wafer by compressing the sapphire wafer on which the etched portion is formed, and a sapphire cover window manufactured thereby.

In addition, in the forming of the cell edge processing portion, a picosecond laser or a femtosecond laser is preferably used.

In addition, the cell edge processing portion preferably contains a modified portion formed along a cell edge by vertically transferring energy from the laser to the sapphire wafer.

In addition, the modified portion preferably is formed in a direction perpendicular to the sapphire wafer along the cell edge and contains a plurality of through holes that are spaced from each other by a distance in a range of 1 to 5 μm.

In addition, the modified portion preferably contains a crack formed around the through holes due to an impact spreading when forming the through holes.

In addition, in the forming of the etched portion, a NaOH aqueous solution, a KOH aqueous solution, or a mixture of both is preferably used as an etchant.

In addition, when using the NaOH solution aqueous as the etchant, the wet etching is preferably performed under the following conditions: a concentration of the NaOH aqueous solution in a range of 50% to 95%, a temperature in a range of 130° C. to 220° C., and an etching time in a range of 1 to 48 hours.

In addition, when using the KOH solution aqueous as the etchant, the wet etching is preferably performed under the following conditions: a concentration of the KOH aqueous solution in a range of 40% to 90%, a temperature in a range of 130° C. to 220° C., and an etching time in a range of 10 minutes to 20 hours.

In addition, the etched portion preferably contains a gap formed along a cell edge between the cells or between the cell and a dummy.

In addition, the gap preferably contains a chamfer having a predetermined depth from the surface of the cell and a predetermined width from a side surface of the cell. The chamfer preferably has a depth that is 10% to 50% of a thickness of the sapphire wafer, and a width in a range of 1 to 50 μm.

In addition, in the forming of the cell edge processing portion, the cell edge processing portion is preferably formed such that a cell size L and cell spacing S, which is cell-to-cell spacing, satisfy 0≤S≤L.

In addition, after the forming of the etched portion, any one or two or more of a black matrix (BM) printed layer, an anti-reflective (AR) coating layer, and an anti-fingerprint (AF) coating layer are preferably formed on the sapphire wafer.

In addition, a cell size L and a thickness T of the sapphire wafer preferably satisfy 10T≤L≤250T.

In the present disclosure, after implementing the entire process at a sapphire wafer level, unit cells are separated from the sapphire wafer, as described above, which is useful when providing a sapphire cover window manufactured by the above method, which has a size of 30 mm or less.

The present disclosure provides a method of manufacturing a sapphire cover window in which the entire process is performable at a wafer level when manufacturing the cover window using a sapphire wafer, and a sapphire cover window manufactured thereby.

In the present disclosure, a cell edge processing portion is formed on the sapphire wafer with a laser beam, and an etched portion is then formed by selectively performing etching on the cell edge processing portion through a wet etching process. As a result, the entire process can be completed at the wafer level, and cells can be separated, thus dramatically improving performance and yield.

In other words, in the present disclosure, the wet etching is performed selectively around the cell edge processing portion, that is, a modified portion being weakened or deformed (through holes and cracks) by absorbing energy from the laser. As a result, a wafer-level process (WLP) that keeps the cells from being separated during the subsequent process and allows the wafer form to be maintained is performable by optimizing process conditions of the laser processing and the wet etching.

In addition, the wafer-level process does not require jigs. Since the wafer itself functions as the jig, a loading or unloading process of the cells onto or from the jig is unnecessary between the respective processes. As a result, the entire process is simplified.

In addition, the manufacturing process of the sapphire cover window using the sapphire wafer, according to the present disclosure, has an advantage in that a strengthening process, a masking process, and the like are unnecessary compared to an existing manufacturing process of a glass-based cover window, thereby further simplifying the entire process.

The sapphire cover window, manufactured thereby, contains the etched portion formed along the cell edge and a chamfer formed particularly on the corner, thereby minimizing chipping or cracking occurring during cell separation. In addition, the sapphire cover window is available as a cover window with improved durability and scratch resistance.

In particular, when manufacturing small products having a size of 30 mm or less, such as cover windows for cameras or smartwatches, productivity can be dramatically improved through the wafer-level process according to the present disclosure, thereby providing high-quality products.

BRIEF DESCRIPTION OF THE DRAWINGS

FIGS. 1A, 1B, 1C, 1D, 1E, 1F, 1G, and 1H illustrate schematic diagrams for explaining an existing cell process;

FIGS. 2A, 2B, 2C, 2D, 2E, 2F, 2G, and 2H illustrate schematic diagrams for explaining a wafer-level process (WLP) according to one embodiment of the present disclosure;

DESCRIPTION OF THE PREFERRED EMBODIMENTS

The present disclosure relates to a method of manufacturing a cover window and a cover window manufactured thereby. More particularly, the present disclosure relates to a method of manufacturing a sapphire cover window in which the entire process is performed at a sapphire wafer level, and a sapphire cover window manufactured thereby.

In the present disclosure, a cell edge processing portion is formed on the sapphire wafer with a laser beam, and an etched portion is then formed by selectively performing etching on the cell edge processing portion through a wet etching process. As a result, the entire process can be completed at the wafer level, and cells can be separated, thus dramatically improving performance and yield.

The sapphire cover window, manufactured thereby, contains the etched portion formed along the cell edge and a chamfer formed particularly on the corner, thereby minimizing chipping or cracking occurring during cell separation. In addition, the sapphire cover window is available as a cover window with improved durability and scratch resistance.

Figure 3:
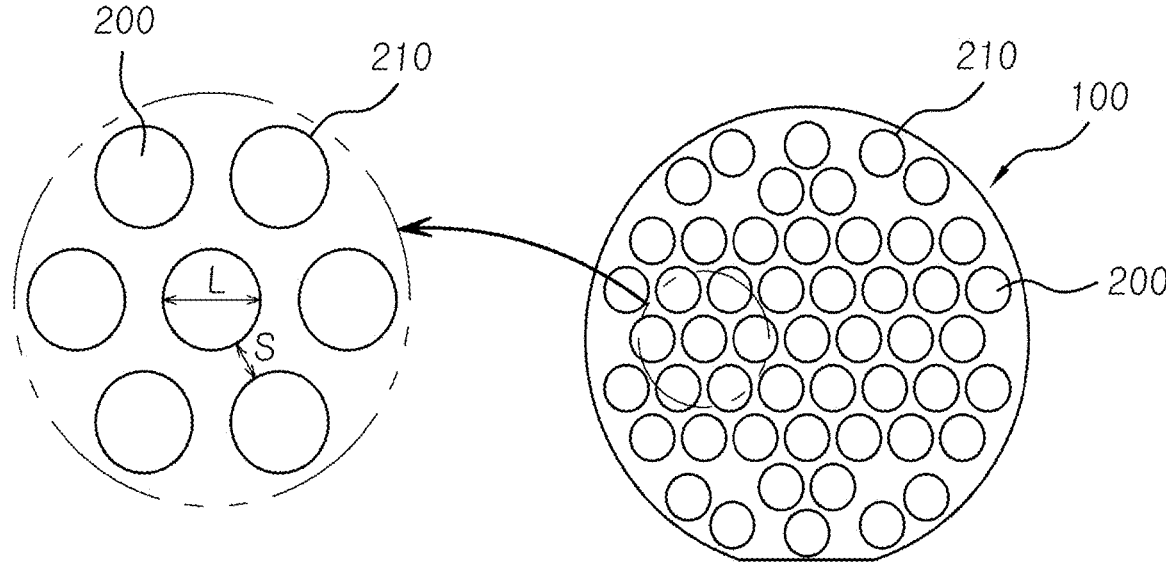
FIG. 3 illustrates a schematic diagram of the cell edge (cell line) formed on a sapphire wafer according to one embedment of the present disclosure.
Figure 4A:
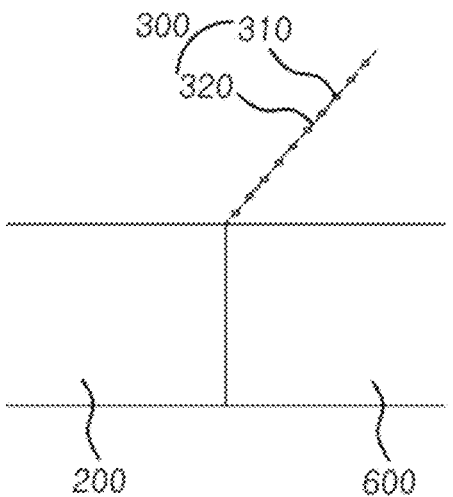
FIGS. 4A and 4B illustrate schematic diagrams for explaining a formation process of a cell edge processing portion (FIG. 4A) and a formation process of an etched portion (FIG. 4B), according to one embodiment of the present disclosure.
Figure 4B:
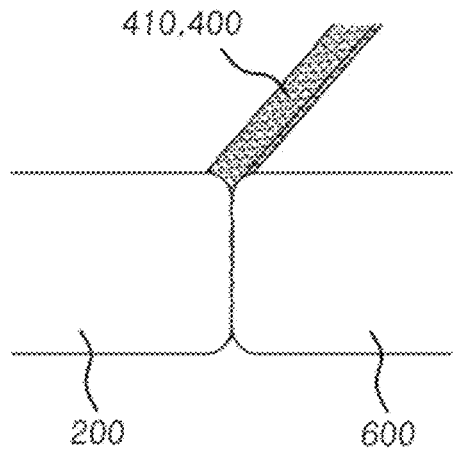
Figure 5:
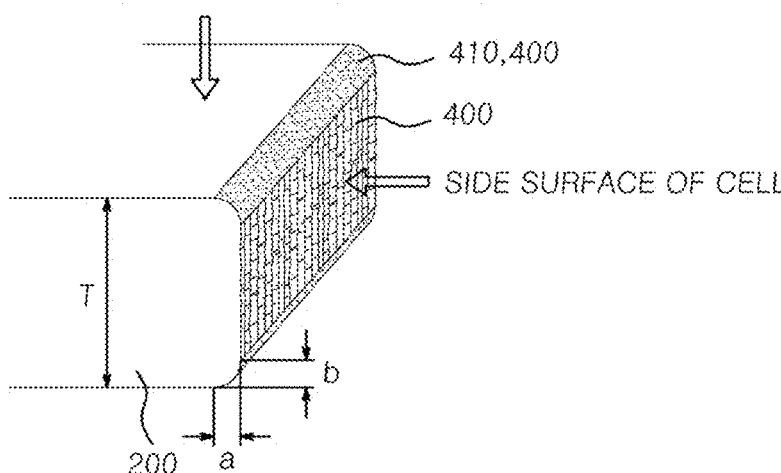
FIG. 5 illustrates a schematic diagram for the side surface of a sapphire cover window manufactured according to one embodiment of the present disclosure.
Figure 6A:
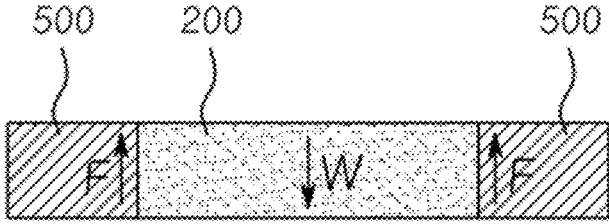
FIGS. 6A and 6B illustrate schematic diagrams for explaining the correlation of frictional force between a cell and a dummy based on the cell weight according to one embodiment of the present disclosure.
Figure 6B:
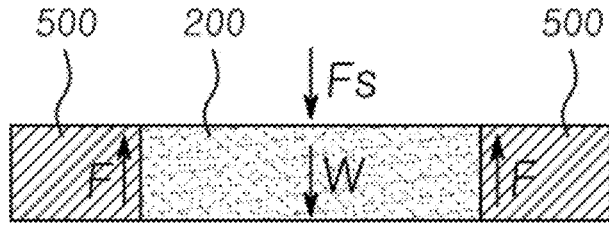
Figure 7A:
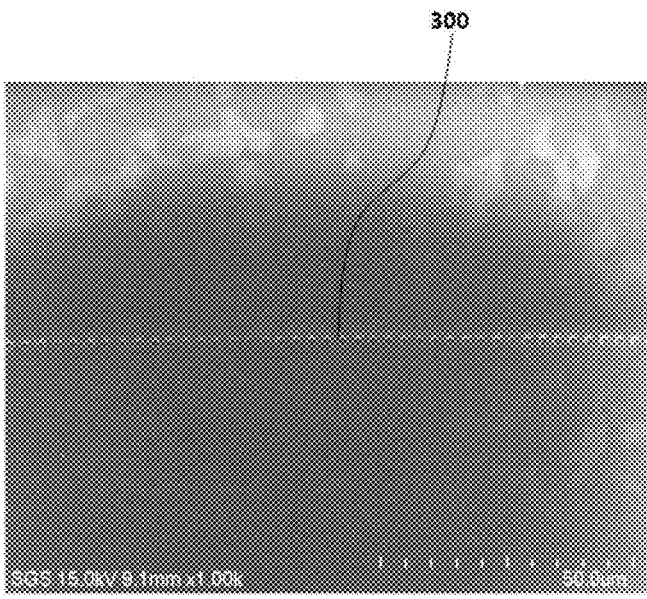
FIGS. 7A, 7B, 7C, and 7D show electron micrographs of the front surface of a sapphire wafer formed after laser processing designed according to one embodiment of the present disclosure.
Figure 7B:
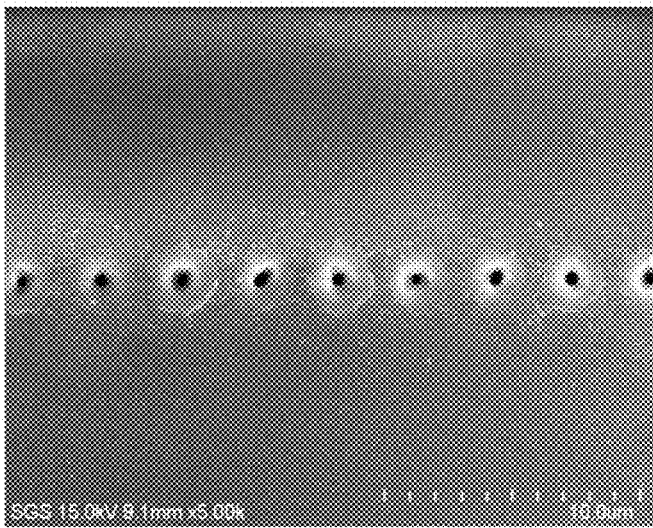
Figure 7C:
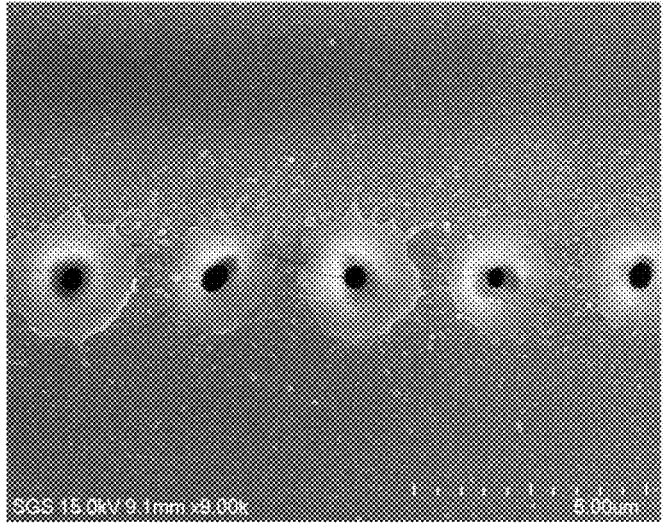
Figure 7D:
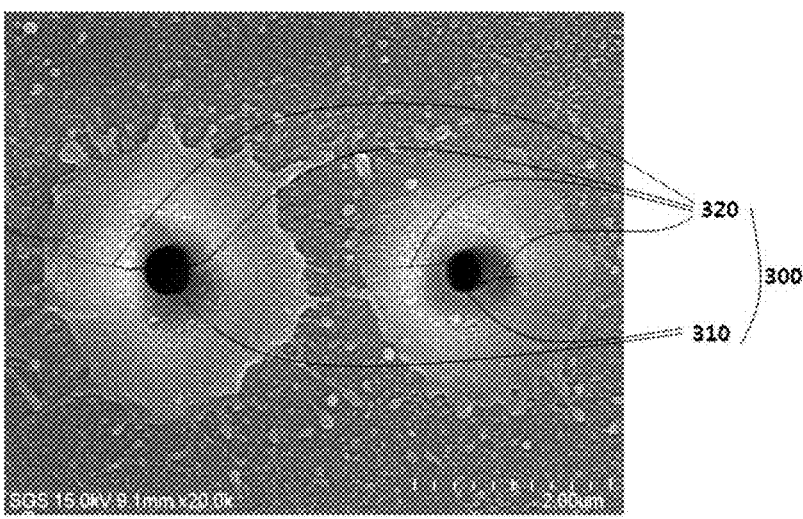
Figure 8A:
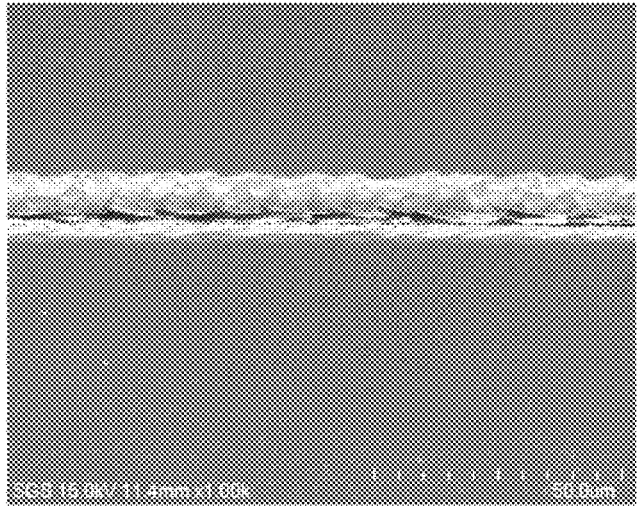
FIGS. 8A, 8B, and 8C show electron micrographs of the front surface of a sapphire wafer formed after wet etching designed according to one embodiment of the present disclosure.
Figure 8B:
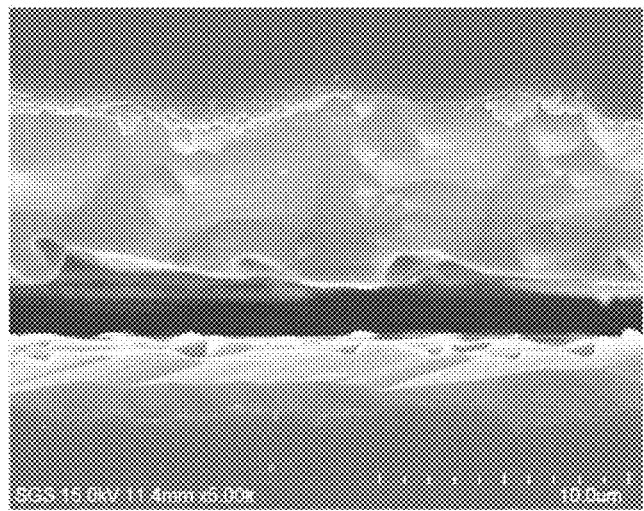
Figure 8C:
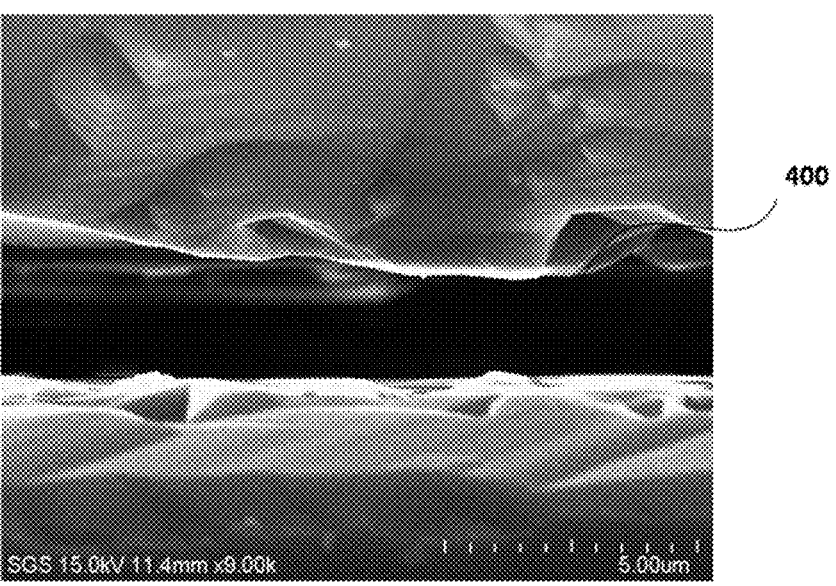
Figure 10A:
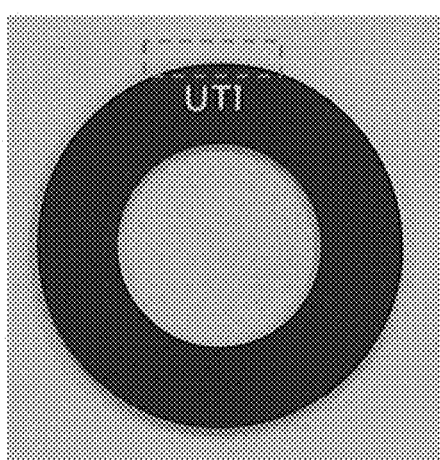
FIGS. 10A and 10B show images of a sapphire cover window manufactured according to the present disclosure.
Figure 10B:
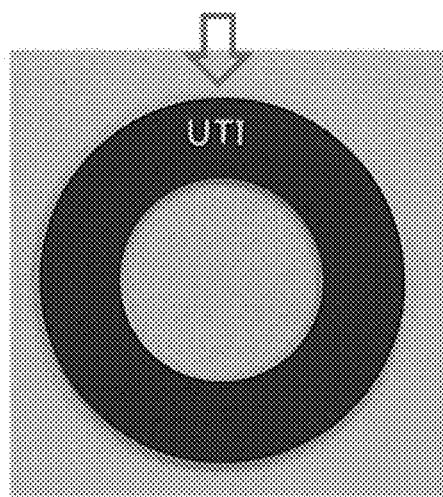
Figure 11:
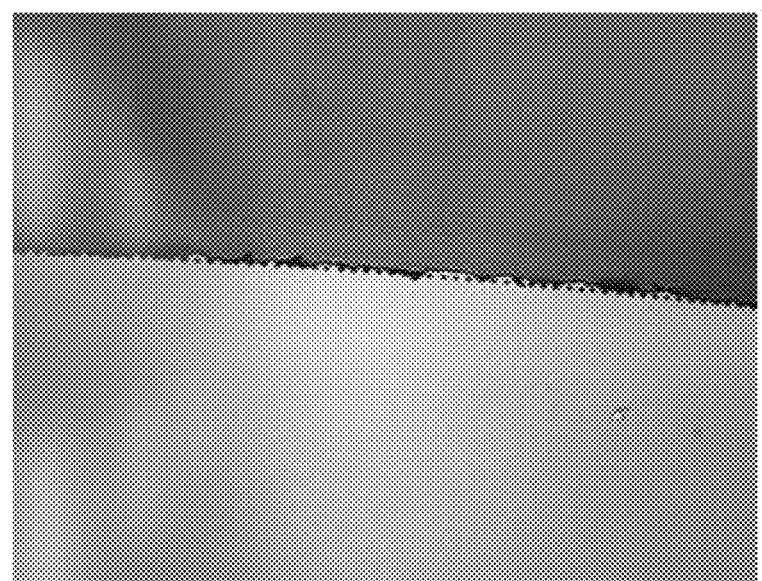
FIG. 11 shows an electron micrograph of the front surface of a cell according to an existing cell process.
Figure 12A:
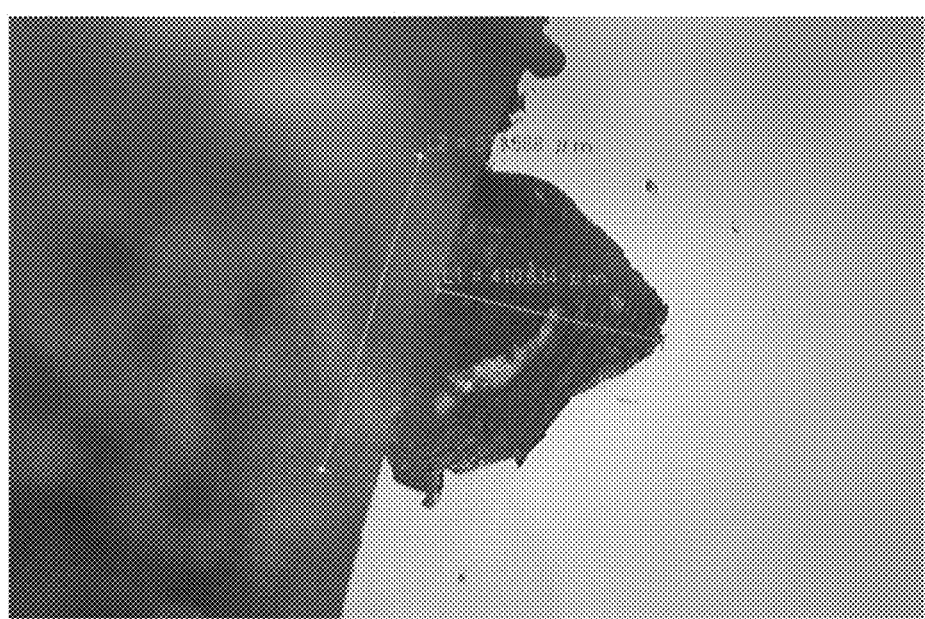
FIGS. 12A and 12B show images of cell edges, enlarged with an optical microscope, when poorly performing a wet etching process during a wafer-level process.
Figure 12B:
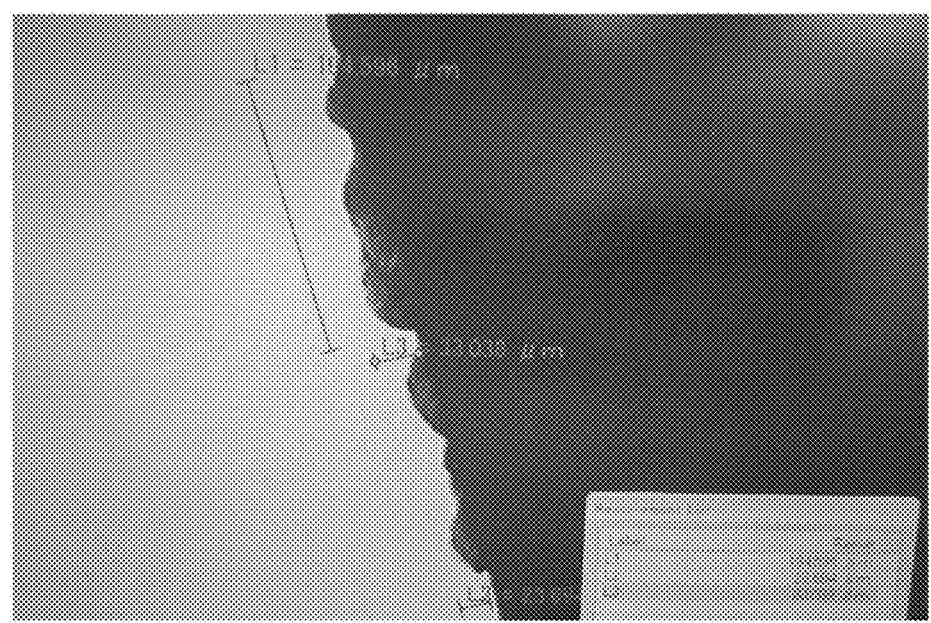
Figure 13A:
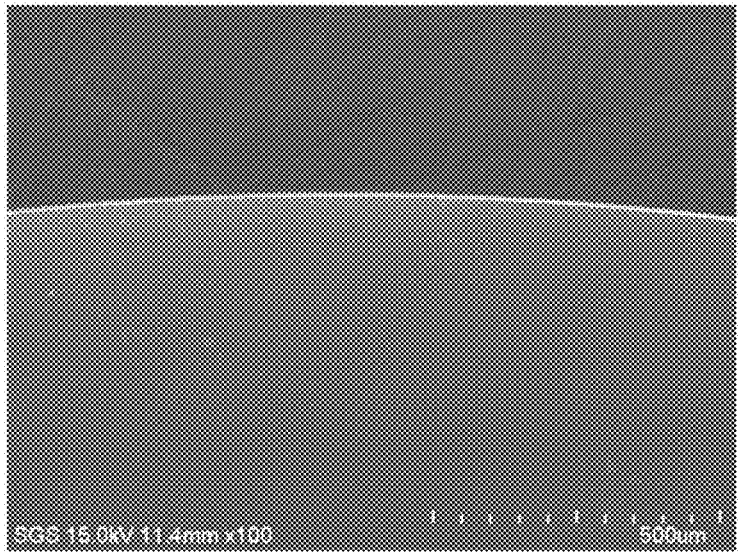
FIGS. 13A, 13B, and 13C show electron micrographs of the front surface of a cell according to one embodiment of the present disclosure.
Figure 13B:
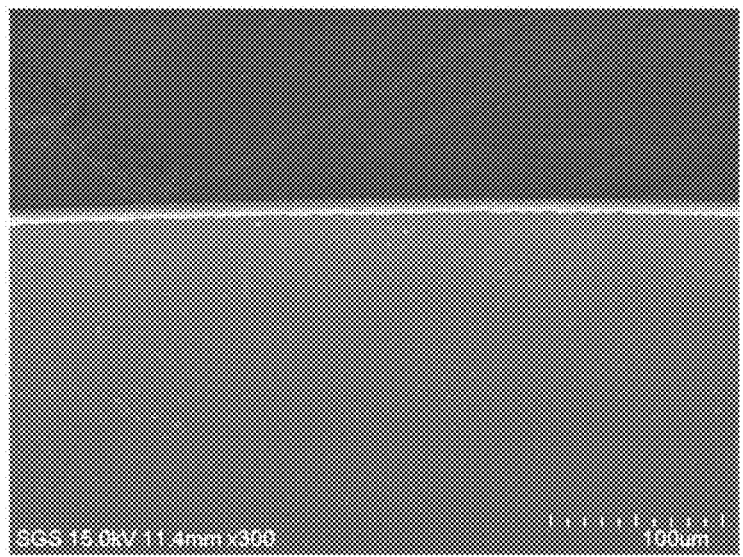
Figure 13C:
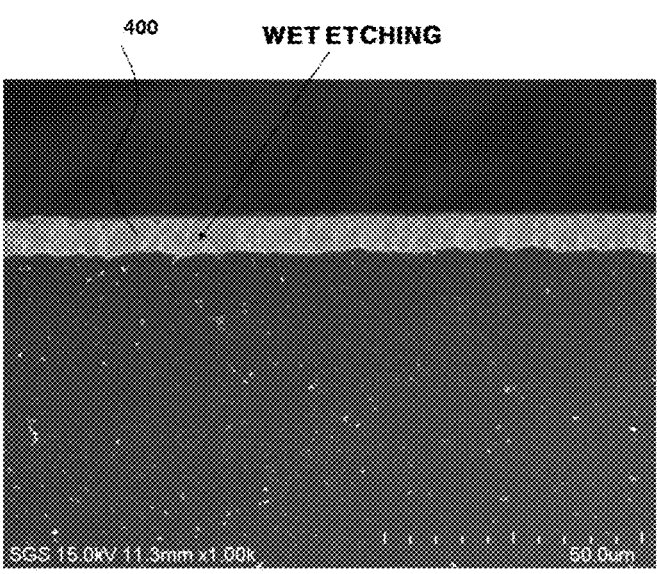
Figures 14, 15A:
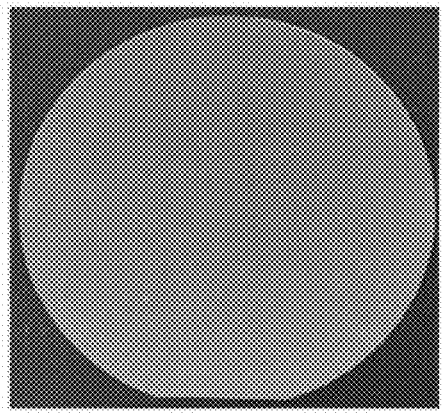
FIG. 14 shows electron micrographs of the side surfaces (upper portion) of cells according to various embodiments of the present disclosure.
FIGS. 15A, 15B, 15C, 15D, and 15E show actual images of a wafer and products after the completion of each process according to one embodiment of the present disclosure.

Hereinafter, the present disclosure will be described in detail with reference to the accompanying drawings. FIGS. 2A, 2B, 2C, 2D, 2E, 2F, 2G, and 2H illustrate schematic diagrams for explaining a wafer-level process (WLP) according to one embodiment of the present disclosure. FIG. 3 illustrates a schematic diagram of the cell edge (cell line) formed on a sapphire wafer according to one embedment of the present disclosure. FIGS. 4A and 4B illustrates schematic diagrams for explaining a formation process of a cell edge processing portion (FIG. 4A) and a formation process of an etched portion (FIG. 4B), according to one embodiment of the present disclosure. FIG. 5 illustrates a schematic diagram for the side surface of a sapphire cover window manufactured according to one embodiment of the present disclosure. FIGS. 6A and 6B illustrate schematic diagrams for explaining the correlation of frictional force between a cell and a dummy based on the cell weight according to one embodiment of the present disclosure. FIGS. 7A, 7B, 7C, and 7D show electron micrographs of the front surface of a sapphire wafer formed after laser processing designed according to one embodiment of the present disclosure. FIGS. 8A, 8B, and 8C show electron micrographs of the front surface of a sapphire wafer formed after wet etching designed according to one embodiment of the present disclosure. FIGS. 9A, 9B, 9C, and 9D show optical micrographs of the front surface and side surfaces of cells according to various embodiments of the present disclosure. FIGS. 10A and 10B show images of a sapphire cover window manufactured according to the present disclosure. FIG. 11 shows an electron micrograph of the front surface of a cell according to an existing cell process. FIGS. 12A and 12B show images of cell edges, enlarged with an optical microscope, when poorly performing a wet etching process during a wafer-level process. FIGS. 13A, 13B, and 13C show electron micrographs of the front surface of a cell according to one embodiment of the present disclosure. FIG. 14 shows electron micrographs of the side surfaces (upper portion) of cells according to various embodiments of the present disclosure. FIGS. 15A, 15B, 15C, 15D, and 15E show actual images of a wafer and products after the completion of each process according to one embodiment of the present disclosure. FIG. 16 shows an image of a dummy remaining after the completion of cell separation according to FIGS. 15A, 15B, 15C, 15D, and 15E.

As illustrated in FIGS. 2A, 2B, 2C, 2D, 2E, 2F, 2G, and 2H, the method of manufacturing the sapphire cover window, according to the present disclosure, includes: preparing a sapphire wafer; forming a cell edge processing portion on the sapphire wafer with a laser beam; forming an etched portion on the sapphire wafer by selectively performing wet etching on the cell edge processing portion; and separating cells from the sapphire wafer by compressing the sapphire wafer on which the etched portion is formed.

The sapphire wafer, according to the present disclosure, is used by cutting an ingot into flat wafers with a required thickness using a diamond saw and then performing polishing. While wafers having a size of about 4 inches are the most commonly used, wafers having a size of up to 12 inches can be used in the present disclosure.

A camera cover window, according to one embodiment of the present disclosure, has a small thickness that is in a range of about 0.3 to 1.0 mm. A processing yield is low when forming an ingot having an excessively large diameter into a wafer, so an ingot preferably has a size of about 4 inches. Accordingly, a wafer having an appropriate size may be used in consideration of the processing yield, depending on the thickness or size of the cover window.

As illustrated in FIGS. 2 and 3, the sapphire wafer 100, according to one embodiment of the present disclosure, has a 4-inch (100 mm) circular form and is used to form a 10-mm circular cell 200. Considering the yield, cell spacing S, which is cell-to-cell spacing, may be appropriately set to maintain the wafer form. Typically, the cell spacing is described as a dummy, and the values thereof may vary depending on the forms of the wafer and cell. However, there may be zero cell spacing depending on process conditions or product specifications.

When forming the cells into a circular form according to one embodiment of the present disclosure, the cell spacing S means spacing between the edges of two cells that are adjacent to each other on a line connecting between the centers of the adjacent cells.

In the sapphire wafer 100 according to one embodiment in FIG. 3, a flat portion having a size of about 30 mm is formed on one surface to indicate direction. In addition, the cell spacing has a size of about 2.0 mm, and the cell 200 has a diameter of about 10 mm, thus manufacturing about 51 cells per sapphire wafer.

The line illustrated in the form of the cell 200 in FIG. 3 is the cell edge 210 or cell line and means the border of the cell (the cell border on the surface or the cell perimeter on the side surface) in the present disclosure.

Such cells may have many different forms, such as a circular form, a square form, and an elliptical form, depending on product specifications.

When the sapphire wafer is prepared as described above (FIG. 2A), the cell edge processing portion 300 is formed on the sapphire wafer 100 with the laser beam (FIG. 2B). That is, the cell edge processing portion 300 is formed along the cell edge 210 as illustrated in the form of the cell in FIGS. 2 and 3.

After aligning the sapphire wafer, a laser system is designed to irradiate the sapphire wafer along the cell edge with the laser beam. For example, the laser energy, spot to spot, spot size, speed, burst, and the like are designed, and the laser system is designed to irradiate the sapphire wafer along the cell edge with an optical system.

The method of manufacturing the sapphire cover window, according to the present disclosure, is implemented as a "wafer-level process (WLP)" in which the subsequent processes are performed at a wafer level. Therefore, the cell edge processing portion 300 is formed such that the wafer form can is well-maintained, and the cell separation process is effortlessly performed.

An ultra-high-speed laser, such as a picosecond laser or a femtosecond laser, may be used in one embodiment of the present disclosure to enable cell processing of the sapphire wafer.

The cell edge processing portion 300 in the present disclosure may encompass any changes that occur in the sapphire wafer 100 when the energy from the laser is transferred to the sapphire wafer 100. The cell edge processing portion 300 may be a modified portion formed along the cell edge when the energy from the laser is vertically transferred.

The modified portion means any change in the sapphire wafer caused by the energy from the laser and may, for example, encompass through holes, cracks, changes in structure or crystalline phase, and the like, as well as any secondary or tertiary changes caused thereby.

In one embodiment of the present disclosure, the modified portion, according to the cell edge processing portion 300, may include a plurality of through holes formed on the sapphire wafer vertically along the cell edge. In addition, the modified portion may contain cracks, which are deformations caused around the periphery of the through holes due to an impact spreading when forming such through holes.

The cracks, according to the present disclosure, occur around the periphery of the through holes, typically in random shapes and random directions.

For example, the cracks, according to the present disclosure, may include any one or two or more of a first crack formed around the periphery of the through holes, a second crack originating from a first through hole and reaching an adjacent second through hole, and a third crack originating from each of the adjacent first and second through holes joining together, but are not limited thereto. In addition, the cracks may have various patterns due to the energy transferred when forming the through holes.

That is, the cell edge processing portion 300, according to the present disclosure, is formed into the modified portion that deforms the sapphire wafer by receiving the energy from the laser. The modified portion may be formed as a primary modified portion caused by directly receiving the energy from the laser, as well as other modified portions, including secondary and tertiary modified portions, caused by the indirect energy transferred during the formation of the first modified portion. The through holes may correspond to the first modified portion, and the cracks may correspond to the secondary or tertiary modified portion.

The size or degree of deformation of such modified portions, for example, the diameter or spacing of the through hole and the degree of cracks, may be adjusted according to the design of the laser system. This is to accomplish the wafer-level process and is determined in consideration of thickness, size, and the like, depending on product specifications.

In one embodiment of the present disclosure, the through holes are formed in a direction perpendicular to the sapphire cover window at an interval in a range of 1 to 5 µm. That is, after the formation of the etched portion and functional layers (a BM printed layer, an AR coating layer, an AF coating layer, and the like) according to the subsequent processes, the through holes are formed at appropriate intervals so that the cell separation can be lastly performed in the wafer-level process. When the interval is smaller than the above range, the cells may be randomly separated during the subsequent processes, making it difficult to control the yield according to the wafer-level process. On the contrary, when the interval is larger than the above range, there may be a concern of impacting or damaging the cells during the cell separation. The interval may be adjusted according to the thickness or size of the cell.

FIGS. 4A and 4B illustrates a schematic diagram for explaining a formation process of the cell edge processing portion (FIG. 4A) and a formation process of the etched portion (FIG. 4B), according to one embodiment of the present disclosure. FIG. 5 illustrates a schematic diagram for the side surface of the sapphire cover window manufactured according to one embodiment of the present disclosure.

FIG. 4A illustrates the through holes 310 and the cracks 320 formed at uniform intervals on the cell edge processing portion 300, and FIG. 4B illustrates the etched portion 400 formed around the cell edge processing portion 300 by performing wet etching, where the chamfer 410 is formed around the cell edge processing portion 300 on the surface of the sapphire wafer.

FIG. 5 illustrates a schematic diagram for the side surface of the cell 200 (sapphire cover window) having a thickness T, which describes the chamfer 410 (the etched portion 400) and the cell edge processing portion 300 (the modified portion, the through holes, the cracks, and the like). In fact, the wet etching of the manufactured sapphire cover window is performed through the cell edge processing portion 300, so the etched portion 400 is mainly observed from the side surface. However, the degree to which the etched portion and the cell edge processing portion are mixed may vary depending on etching conditions or product specifications. In addition, FIG. 5 illustrates the through holes and the etched portion 400 formed along the cracks around the periphery of the through holes.

In addition, the cell edge processing portion is formed such that a cell size L (a diameter in the case of a circular cell and a diagonal length in the case of a rectangular cell) and the cell spacing S, which is the cell-to-cell spacing, satisfy $0 \le S \le L$ (see FIG. 3). In other words, the cell may be formed without the dummy depending on product specifications, or adjacent cells may be formed at a cell-level spacing in consideration of product yield. In terms of lowering the defect rate and stably maintaining the wafer form, $0.05L \le S \le L$ is further preferable.

In addition, the cell edge processing portion 300 is formed such that the cell size L and a sapphire wafer thickness T satisfy $10T \le L \le 250T$. In other words, when the thickness is excessively large or small compared to the cell size, the wafer-level process may be poorly performed. For example, in the case of $L > 250 \times T$, the cell size is excessively large compared to the sapphire wafer thickness, making it difficult to maintain the wafer form. In the case of $L < 10 \times T$, the cell size is excessively small compared to the sapphire wafer thickness, so the cell separation process may be poorly performed, or damage may occur to the side surface during the cell separation.

In addition, in the formation process of the cell edge processing portion with the laser beam, an alignment marker may be formed using a laser for convenience in the subsequent process. The alignment marker may include an optical marker or a mechanical marker.

As described above, in the present disclosure, the cell edge processing portion is formed on the sapphire wafer with the laser beam, so the cells are held between the dummy without being detached. In addition, the wafer form is maintained so that the cells can be separated smoothly in the final process.

Furthermore, when the cell edge processing portion 300 is formed, the sapphire wafer 100 is wet-etched so that the cell edge processing portion 300 is selectively wet-etch, thereby forming the etched portion 400 on the sapphire wafer 100 (FIG. 2B). In other words, the cell edge processing portion 300 is wet-etched while an etchant penetrates the cell edge processing portion 300 that has been weakened or deformed by absorbing energy from the laser. Accordingly, the etched portion 400 is formed around the cell edge processing portion 300.

Typically, wet etching is hardly performed on the surface of the sapphire wafer especially with the etchant according to one embodiment of the present disclosure. In addition, an etching ratio between the surface of the sapphire wafer and the cell edge processing portion is in a range of about 1:tens to hundreds. Thus, the wet etching is performed intensively (selectively) on the cell periphery processing portion to form the etched portion.

The etched portion 400 may be formed around the cell edge processing portion in various patterns due to the penetration of the etchant. When the modified portion is the through hole, the size (diameter) of the through hole becomes large or widens, so the adjacent through holes are partially joined together. Alternatively, when the modified portion is the crack (the first, second, and third cracks), the cracks get worse and thus spread along the cell edge, or the cracks widen and thus form gaps. Accordingly, the cracks and the etched portion 400 are joined together.

The etched portion having various patterns may be formed on a part of all of the cell edge processing portion, and may cause gaps to be formed between the cells or between the cell and the dummy along the cell edge.

The gaps are formed with projections or surface roughness due to the etching of the cell edge processing portion (the modified portion, the through holes, the cracks, and the like) around the through holes and the irregularly formed cracks. In other words, the gaps may be formed between the cells or between the cell and the dummy by connecting the through holes, or may be formed by etching the surface of the cracks.

In particular, the etching is further actively performed around the cell edge processing portion, so the gaps may contain the chamfer having a predetermined depth (described as "b" in FIG. 5) from the front surface (surface) of the cell and a predetermined width (described as "a" in FIG. 5) from the side surface of the cell. The chamfer may have a depth that is 10% to 50% of the thickness of the sapphire cover window and a width in a range of 1 to 50 μm (an interval between side surfaces of adjacent cells around the cell edge processing portion).

The chamfer functions to further smooth the outer corner of the cell and reduce microcracks occurring during the cell processing with the laser beam. In addition, the chamfer has a form in which sharp corners are softened, thereby preventing breakage during assembly and reducing damage from external impact during use. When the chamfer is excessively large, the cell is easily separated in the middle of the process, making the process difficult to be performed at the wafer level. On the contrary, when the chamfer is excessively small, chipping or cracking may occur during the cell separation.

As described above, the etched portion may be formed into a smooth surface by adjusting the surface roughness of the cell edge processing portion, into the chamfer having a predetermined depth and width on the surface along the cell line, or into the gaps and the like formed from the cracks widened due to the penetration of the etchant. The etched portion is formed by adjusting the degree of etching in consideration of the implementation of the wafer-level process and the cell separation.

That is, due to the cell edge processing portion and the etched portion, parts connected to adjacent cells and parts not connected to adjacent cells coexist between the cells or between the cell and the dummy. In addition, even when being connected, these parts are connected to the gaps with projections or surface roughness. As a result, even after the formation of the cell edge processing portion and the completion of the etching, the cells are kept from being separated and remain in the wafer form.

As described above, the wet etching of the sapphire wafer is difficult to be implemented. In the present disclosure, the wet etching is performed around the cell edge processing portion, that is, the modified portion being weakened or deformed (the through holes, the cracks, and the like) by absorbing energy from the laser. To implement the wafer-level process according to the present disclosure, the cell processing and the etching work organically with each other.

As the etchant for the wet etching of the sapphire wafer used herein, a NaOH aqueous solution, a KOH aqueous solution, or a mixture of both may be used. In the case of using the NaOH aqueous solution as the etchant, the wet etching is performed under conditions: a concentration (weight ratio concentration) of the NaOH aqueous solution in a range of 50% to 95%, a temperature in a range of 130° C. to 220° C., and an etching time in a range of 1 to 48 hours. In the case of using the KOH aqueous solution as the etchant, the wet etching is performed under conditions: a concentration (weight ratio concentration) of the KOH aqueous solution in a range of 40% to 90%, a temperature in a range of 130° C. to 220° C., and an etching time in a range of 15 minutes to 20 hours.

As described above, while performing the wafer-level process, the wet etching process conditions are adjusted in consideration of the thickness and size of the cell so that the cells are kept from being randomly detached (being separated). Depending on the wet etching process conditions, when the degree of the wet etching is less than the above range, the etched portion is formed insufficiently for the cell separation. On the contrary, when the degree of the wet etching exceeds the above range, the cells may be randomly separated due to the excessive etching, thereby reducing the yield in the wafer-level process.

In addition, a process of polishing the surface of the sapphire wafer may be further performed after the formation of the etched portion, according to a surface condition. In other words, when the surface roughness and scratches created on the surface get severe after the wet etching, the polishing process may be further performed to remove the scratches and improve the surface roughness. As for the polishing process, diamond mechanical polishing (DMP), chemical mechanical polishing (CMP), or a combination thereof may be performed, depending on the scratch depth and the surface roughness.

On the other hand, according to one embodiment of the present disclosure, a cleaning process is performed at the wafer level after the formation of the etched portion 400 (FIG. 2C). When the wet etching process is completed, the wafer is transferred to a cleaning tank at the wafer level, and then the cleaning process, such as ultrasonic cleaning, is performed. In the existing cell process, a process of transferring the individual cells to the jig is necessary. However, in the present disclosure, the wafer itself functions as the jig and thus only needs to be transferred for the subsequent process. If necessary, a jig capable of placing a plurality of wafers may be designed to improve productivity.

When the cleaning process is completed, various functional layers may be formed on the sapphire wafer (FIG. 2D). The functional layer may be formed on one surface or both surfaces of the sapphire wafer according to product specifications. In addition, the functional layer may be formed of any one or two or more layers of a deposition layer, a coating layer, a printed layer, and an etching layer, or may be formed of a mixture thereof to form a multilayer structure.

For example, in the case of a camera cover window, the functional layer may be the printed layer, the coating layer, the deposition layer, and the like formed on a periphery portion, except for the area through which a core portion is transmitted.

Specifically, as illustrated in FIGS. 2A, 2B, 2C, 2D, 2E, 2F, 2G, and 2H, a black matrix (BM) printed layer 510 may be formed on the border of the rear surface of the cell (FIG. 2D), an anti-reflective (AR) coating layer 520 may be formed on the entire area or the core area (in one embodiment of the present disclosure, the AR coating layer is formed on the entire area of the rear surface) of the rear surface or both surfaces of the cell (FIG. 2F), or an anti-fingerprint (AF) coating layer 530 may be formed on the entire area of the front surface of the cell (FIG. 2G). Alternatively, if necessary, an etching layer with an etched pattern may be formed.

The cleaning process (FIG. 2E) may be included, as necessary, in between the above processes. One embodiment of the present disclosure illustrates that the cleaning process (FIG. 2E) is performed in between the process of forming the BM printed layer (FIG. 2D) and the process of forming the AR coating layer (FIG. 2F).

The process of forming such functional layers and the cleaning process are performed as the wafer-level process, which dramatically simplifies the process compared to the existing cell process and extraordinarily improves product yield and unit cost.

As described above, in the present disclosure, the cell edge processing portion and the etched portion are formed by optimizing the process conditions of the laser processing and the wet etching in consideration of product specifications so that the wafer-level process is enabled. As a result, the cells are kept from being separated during the subsequent process, thereby enabling the wafer-level process (WLP).

As described above, compared to the existing cell process, the wafer-level process does not require a jig, and the wafer itself functions as a jig. As a result, the entire process becomes significantly simplified without unnecessary processes of loading and unloading the cells onto and from the jig between the respective processes. In addition, since the thickness of the dummy is the same as that of the cell, both surfaces (front and back surfaces) of the cell are exposed, thereby effortlessly performing the process during printing (on the rear surface), cleaning (on both surfaces), AR coating (on the rear surface or both surfaces), and AF coating (on the front surface).

Lastly, when the entire wafer-level process is completed, the sapphire wafer on which the etched portion and the functional layers are formed is compressed to separate the cells from the sapphire wafer, thereby providing sapphire cover windows (FIG. 2H).

FIG. 2H illustrates the sapphire cover windows in unit cells that are finally separated from the sapphire wafer, in which the BM printed layer 510 and the AR coating layer 520 are formed on the rear surface of the cell 200, and the AF coating layer 530 is formed on the front surface of the cell 200.

As described above, between the cells or between the cell and the dummy are connected by the frictional force generated along the cell edge through gaps caused due to the cell edge processing portion and the etched portion. Therefore, the cells are separated from the sapphire wafer by vertically applying a physical load having a predetermined size to the sapphire wafer.

FIGS. 6A and 6B illustrate the correlation between the frictional force F between the cell 200 and the dummy 600 based on the cell weight W according to one embodiment of the present disclosure. The etched portion, such as the gaps with projections on the surface, is formed between the cell 200 and the dummy 600 after the wet etching. The frictional force F between the cell 200 and the dummy 600 is greater than the weight W of the cell 200, so the cell 200 is kept from being detached from the dummy 600 (FIG. 3A). In addition, when a load Fs greater than the frictional force F is vertically applied, the cell 200 is separated from between the dummy 600 (FIG. 3B).

In this case, the cell is easily separated by the etched portion formed along the cell line without chipping or cracking occurring on the side surface of the cell.

As described above, the present disclosure can dramatically increase productivity and provide high-quality products when manufacturing small products having a size of 30 mm or less, such as cover windows for cameras or smartwatches, through the wafer-level process in which the cell units are separated from the wafer after implementing the entire process at a sapphire wafer level.

Hereinafter, various examples and comparative examples of the present disclosure will be described in detail. A sapphire wafer having a diameter of 100 mm and a thickness of 0.33 mm was prepared.

Example 1

1) Formation of Cell Edge Processing Portion with Laser Beam

Using a femtosecond laser

Using a Bessel beam optical system based on a Fresnel lens 500-fs laser pulse 1040-nm wavelength Spot to spot: 2.5 μm Spot size: 1.0-μm diameter Speed: 80 mm/sec Burst: 4

2) Formation of Etched Portion by Wet Etching a NaOH aqueous solution (60% at 170° C.)

6 hours or less: Conditions where cells are unlikely to be separated (damage occurs during cell separation)

Ranging from 7 hours to 19 hours: Conditions where cells are well-separated 20 hours or more: Conditions where cells are detached during the formation processes of functional layers a KOH aqueous solution (60% at 170° C.)

2 hours or less: Conditions where cells are unlikely to be separated (damage occurs during cell separation)

Ranging from 3 hours to 9 hours: Conditions where cells are well-separated 10 hours or more: Conditions where cells are detached during the formation processes of functional layers

Example 2

1) Formation of Cell Edge Processing Portion with Laser Beam

Using a picosecond laser

Using a Bessel beam optical system based on a Fresnel lens 8-ps laser pulse 1040-nm wavelength Spot to spot: 2.5 μm Spot size: 1.0-μm diameter Speed: 70 mm/sec Burst: 2

2) Formation of Etched Portion by Wet Etching a NaOH aqueous solution (60% at 170° C.)

14 hours or less: Conditions where cells are unlikely to be separated (damage occurs during cell separation)

Ranging from 15 hours to 47 hours: Conditions where cells are well-separated 48 hours or more: Conditions where cells are detached during the formation processes of functional layers a KOH aqueous solution (60% at 170° C.)

7 hours or less: Conditions where cells are unlikely to be separated (damage occurs during cell separation)

Ranging from 8 hours to 19 hours: Conditions where cells are well-separated 20 hours or more: Conditions where cells are detached during the formation processes of functional layers

Example 3

1) Formation of Cell Edge Processing Portion with Laser Beam

Using a femtosecond laser

Using a Bessel beam optical system based on a Fresnel lens 350-fs laser pulse 1040-nm wavelength Spot to spot: 3 μm spot size: 1.5-μm diameter Speed: 50 mm/sec Burst: 2

2) Formation of Etched Portion by Wet Etching a NaOH aqueous solution (80% at 190° C.)

1 hour or less: Conditions where cells are unlikely to be separated (damage occurs during cell separation)

Ranging from 2 hours to 6 hours: Conditions where cells are well-separated 7 hours or more: Conditions where cells are detached during the formation processes of functional layers a KOH aqueous solution (80% at 190° C.)

15 minutes or less: Conditions where cells are unlikely to be separated (damage occurs during cell separation)

Ranging from 0.5 hours to 1 hour: Conditions where cells are well-separated 2 hours or more: Conditions where cells are detached during the formation processes of functional layers

Example 4

1) Formation of Cell Edge Processing Portion with Laser

Using a picosecond laser

Using a Bessel beam optical system based on a Fresnel lens 10-ps laser pulse 1040-nm wavelength Spot to spot: 3 μm Spot size: 1.5-μm diameter Speed: 50 mm/sec Burst: 2

2) Formation of Etched Portion by Wet Etching a NaOH aqueous solution (80% at 200° C.)

2 hours or less: Conditions where cells are unlikely to be separated (damage occurs during cell separation)

Ranging from 3 hours to 12 hours: Conditions where cells are well-separated 13 hours or more: Conditions where cells are detached during the formation processes of functional layers a KOH aqueous solution (80% at 200° C.)

1 hour or less: Conditions where cells are unlikely to be separated (damage occurs during cell separation)

Ranging from 1.5 hours to 3 hours: Conditions where cells are well-separated 4 hours or more: Conditions where cells are detached during the formation processes of functional layers The optimal etching amount is adjusted for each etching time according to the given types of etchant (NaOH aqueous solution or KOH aqueous solution), concentration, and temperature as described above so that the cell separation is performed smoothly while well maintaining the wafer form until the final process.

According to the above embodiments, when the etching amount is excessively small, damage to the cell or dummy occurs during the cell separation. When the etching amount is appropriate, the subsequent process may be performed while maintaining the wafer form in the post-etching process. In addition, during the cell separation, damage to the cell or dummy does not occur, and the cells are easily separated by a predetermined pressure. On the contrary, when the etching amount is excessively large, the cells may be detached from the wafer during the post-etching process, making the wafer-level process impossible.

The above embodiments aim is to find the optimal process conditions for the wafer-level process by adjusting the etching time in a specific concentration and temperature range of the NaOH aqueous solution and the KOH aqueous solution. When the concentration and temperature range are changed, the appropriate etching time may be found through experiments. When forming gaps with proper projections and surface roughness between the cell and the dummy by adjusting the temperature and time according to the etchant, cell separation conditions can be found while maintaining the wafer-level process conditions.

FIGS. 7A, 7B, 7C, and 7D show electron micrographs of the front surface of the sapphire wafer formed after the laser processing designed according to one embodiment of the present disclosure (when using a NaOH aqueous solution (a concentration of 80%, a temperature of 190° C., and an etching time of 4 hours) in Example 3). In this case, the cell edge processing portion 300 (the through holes 310, the modified portion around the periphery of the through holes, the cracks 320 formed around the periphery of the through holes, the cracks 320 connecting between the through holes, and the like) was formed with the laser beam.

FIGS. 8A, 8B, and 8C show electron micrographs of the front surface of the sapphire wafer formed after the wet etching designed according to one embodiment of the present disclosure (when using a NaOH aqueous solution (a concentration of 80%, a temperature of 190° C., and an etching time of 4 hours) in Example 3). In this case, the etched portion 400 was formed by performing the wet etching along the cell edge processing portion (the through holes and the cracks). As shown in FIGS. 8A, 8B, and 8C, between the through holes were completely connected on the surface, thereby forming gaps with projections or surface roughness. In addition, a chamfer having a predetermined depth and width from the surface was formed.

Even when the cell edge processing portion and the etched portion are formed, the wafer form is maintained due to the various patterns of the etched portion.

FIG. 9 shows optical micrographs of the front surface and side surfaces of the cells according to various embodiments (when using a NaOH aqueous solution (a concentration of 80%, a temperature of 190° C., and etching times of 2 hours, 4 hours, 6 hours, and 8 hours) in Example 3) of the present disclosure. In this case, the wet etching times in FIGS. 9A, 9B, 9C, and 9D were set to 2 hours, 4 hours, 6 hours, and 8 hours, respectively.

As shown in FIGS. 9A, 9B, 9C, and 9D, as the wet etching time increased, it was confirmed that the gap on the front surface gradually widened (the width and depth of the chamfer increased), and the etching proceeded from the surface when viewed from the side surfaces 1 and 2 (at high magnification). Existing sapphire wafers are not easily wet-etched. However, in the present disclosure, wet etching is implemented through cell deformation caused by the cell edge processing portion.

Figure 9A:
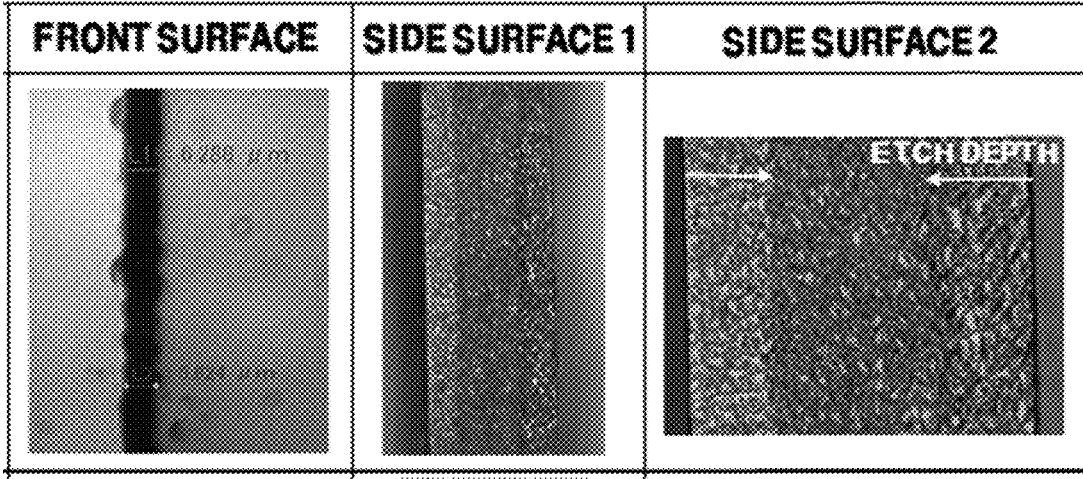
FIGS. 9A, 9B, 9C, and 9D show optical micrographs of the front surface and side surfaces of cells according to various embodiments of the present disclosure.
Figure 9B:
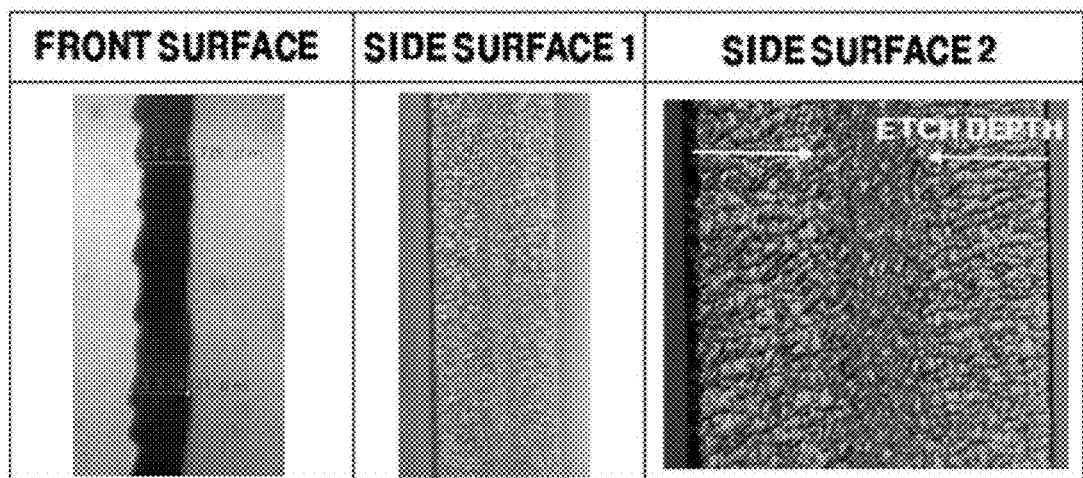
Figure 9C:
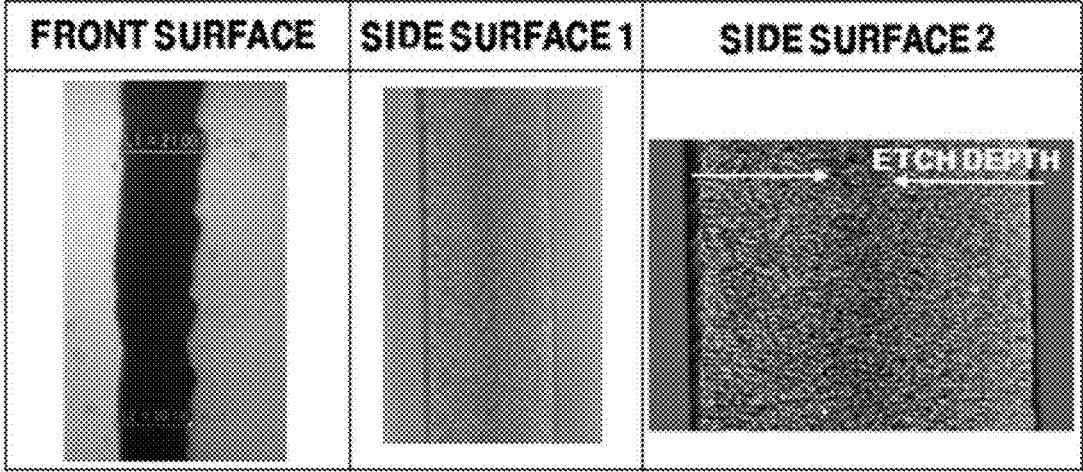
Figure 9D:
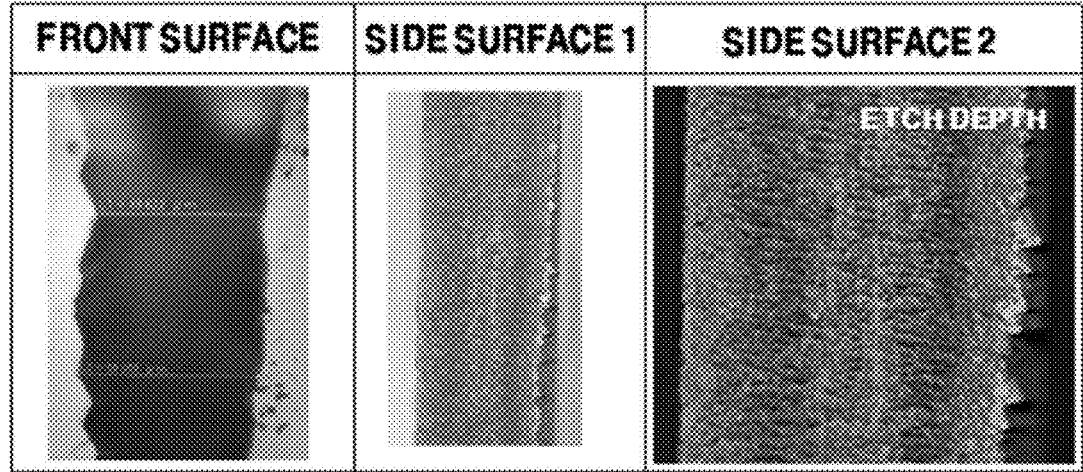

In the case of setting the wet etching time to 2 hours in FIG. 9A, the cell separation was performable at a load of about 5 kg. In the case of setting the wet etching time to 4 hours in FIG. 9B, the cell separation was performable at a load of about 2 kg, enabling the cells to be smoothly separated at a moderate level. In the case of setting the wet etching time to 6 hours in FIG. 9C, the cell separation was performable at a load of about 1 kg, enabling the cells to be smoothly separated at a moderate level. On the contrary, in the case of setting the wet etching time to 8 hours in FIG. 9D, cell separation occurs spontaneously, making the wafer-level process impossible. In other words, the cells become detached while performing the subsequent process.

FIGS. 10A and 10B show images of the sapphire cover window manufactured according to one embodiment (when using a NaOH aqueous solution (a concentration of 80%, a temperature of 190° C., and an etching time of 4 hours) and forming functional layers in Example 3) of the present disclosure. In this case, the sapphire cover window was formed into a circular cell having a diameter of 10 mm. The parts highlighted in red in FIGS. 10A (front surface) and 10B (side surface) were taken with an electron microscope.

FIG. 11 shows an electron micrograph of the front surface of a cell according to an existing cell process (when manufacturing the cell by completely separating the cell with a laser beam and forming functional layers in Example 3).

FIG. 11 shows the image of the front surface according to the existing cell process. In this case, negative factors, such as chipping and cracks on the surface, rough and sharp corner surface, and the like, were observed. In other words, in the existing cell process, the laser process was the last process performed on the side of the cell. As a result, it was confirmed that the corners were easily broken, and substantial chipping occurred.

FIGS. 12A and 12B show enlarged images of the cell edge, enlarged with an optical microscope, when poorly performing the wet etching process during the wafer-level process (when performing the wet etching for 1 hour or less in Example 3). In this case, the sapphire wafer was poorly wet-etched, thereby insufficiently forming the chamfer. As a result, it was confirmed that chipping occurred on the edge.

FIGS. 13A, 13B, and 13C show electron micrographs of the front surface of the cell according to one embodiment (when using a NaOH aqueous solution (a concentration of 80%, a temperature of 190° C., and an etching time of 4 hours) and forming functional layers in Example 3) of the present disclosure.

FIGS. 13A, 13B, and 13C show the front surface according to one embodiment of the present disclosure by varying magnification. In this case, the wet-etched portion was observed on the surface, and the chamfer was well-formed at the corner of the cell without chipping and the like. As a result, it was confirmed that the surface (border) was formed much smoother than that of the existing cell process.

FIG. 14 shows electron micrographs of the side surfaces (upper portion) of the cell according to various embodiments (when using a NaOH aqueous solution (a concentration of 80%, a temperature of 190° C., and etching times of 2 hours, 4 hours, and 6 hours) and forming functional layers in Example 3) of the present disclosure.

As shown in FIG. 14, the etched portion formed by the wet etching was able to be observed. In addition, as the etching time increased, the area of the etched portion increased, confirming that the interval between the gaps increased.

Figure 15B:
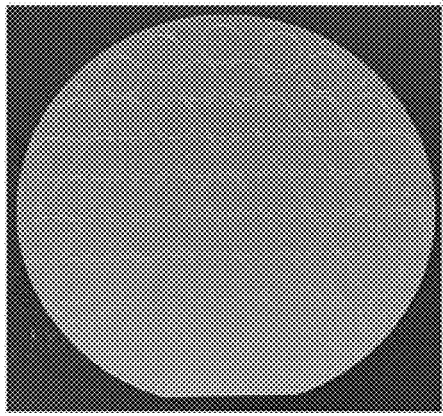
Figure 15C:
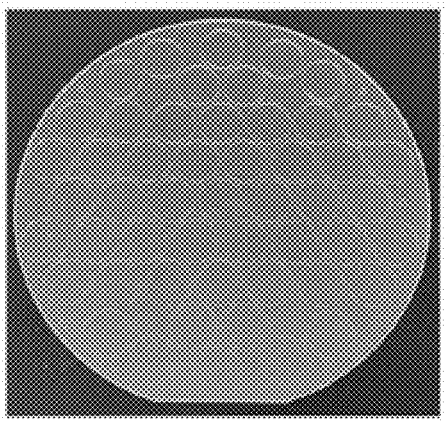
Figure 15D:
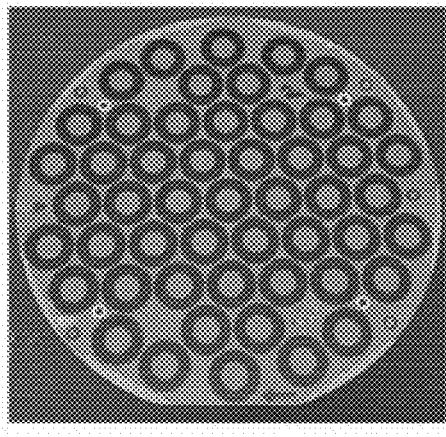
Figure 15E:
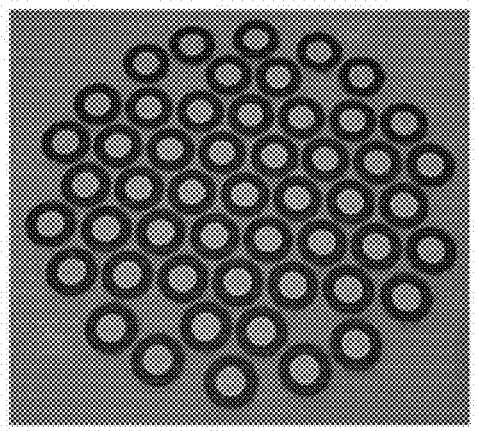
Figure 16:
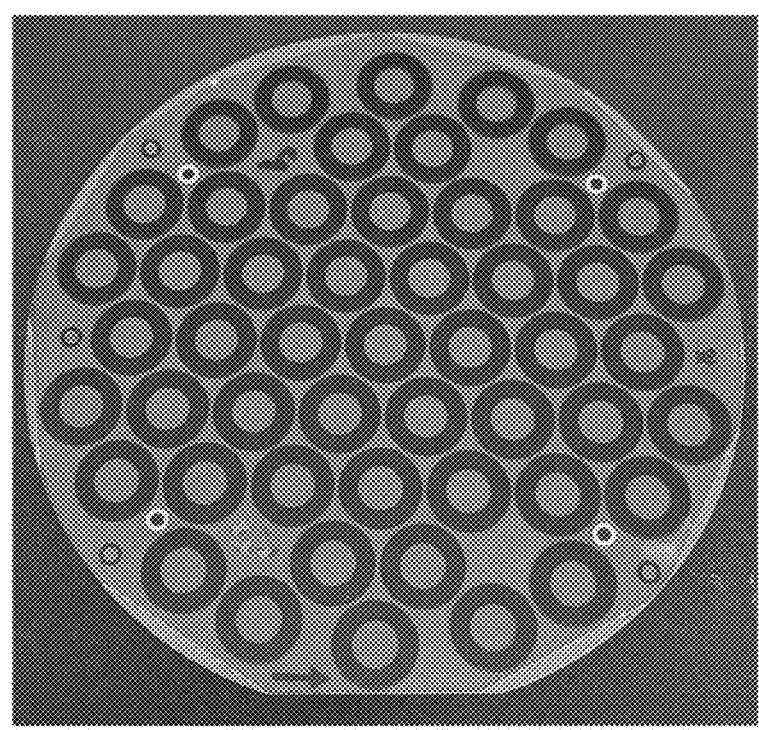
FIG. 16 shows an image of a dummy remaining after the completion of cell separation according to FIGS. 15A, 15B, 15C, 15D, and 15E.

FIGS. 15A, 15B, 15C, 15D, and 15E show actual images of the wafer and products after the completion of each process according to one embodiment of the present disclosure, in which FIG. 15A shows the sapphire wafer, FIG. 15B shows the cell edge processing portion formed on the sapphire wafer with the laser beam according to one embodiment of the present disclosure, FIG. 15C shows the etched portion formed around the cell edge processing portion by wet-etching the sapphire wafer on which the cell edge processing portion is formed according to one embodiment of the present disclosure, FIG. 15D shows a printed layer formed on each cell while maintaining the sapphire wafer form, and FIG. 15E shows each cell separated from the sapphire wafer.

FIG. 16 shows an image of the dummy remaining after the completion of the cell separation according to FIGS. 15A, 15B, 15C, 15D, and 15E. In this case, only the cells were cleanly separated, and the wafer form was well-maintained even when the cell separation was completed.

As described above, the present disclosure provides the method of manufacturing the sapphire cover window in which the entire process is performable at the wafer level when manufacturing the cells using the sapphire wafer, and the cover window manufactured thereby, which dramatically improves mass productivity and yield.

In particular, in the present disclosure, wet etching is selectively performed around the cell edge processing portion, that is, the modified portion being weakened or deformed (through holes and cracks) by absorbing energy from the laser. Accordingly, difficult problems occurring when performing the wet etching on the existing sapphire wafer can be solved, so the wafer-level process (WLP) using the sapphire wafer is enabled.

The sapphire cover window, manufactured thereby, contains the etched portion formed along the cell edge and the chamfer formed particularly on the corner, thereby minimizing chipping or cracking occurring during cell separation. In addition, the sapphire cover window is available as a sapphire cover window with improved durability and scratch resistance.

In particular, when manufacturing small products having a size of 30 mm or less, such as cover windows for cameras or smartwatches, productivity can be dramatically improved through the wafer-level process according to the present disclosure, thereby providing high-quality products.

What is claimed is:

1. A method of manufacturing a sapphire cover window, the method comprising:

preparing a sapphire wafer;

forming a cell edge processing portion on the sapphire wafer with a laser beam;

forming an etched portion on the sapphire wafer by selectively performing a wet etching on the cell edge processing portion; and separating a cell from the sapphire wafer by applying a compressive force after completion of all wafer-level processes, the etched portion on the sapphire wafer being formed such that the sapphire wafer remains as an integral wafer during printing, coating, and cleaning processes prior to the separation wherein in the forming of the etched portion, a NaOH aqueous solution, a KOH aqueous solution, or a mixture of both is used as an etchant, wherein when using the NaOH aqueous solution as the etchant, the wet etching is performed under the following conditions: a concentration of the NaOH aqueous solution in a range of 50% to 95%, corresponding to a temperature in a range of 130° C. to 220° C., and an etching time in a range of 1 to 48 hours, and the conditions of the wet etching are adjusted in consideration of a thickness and size of the cell so that the cell is kept from being separated during the wafer-level processes, and wherein when using the KOH aqueous solution as the etchant, the wet etching is performed under the following conditions: a concentration of the KOH aqueous solution in a range of 40% to 90%, corresponding to a temperature in a range of 130° C. to 220° C., and an etching time in a range of 10 minutes to 20 hours, and the conditions of the wet etching are adjusted in consideration of a thickness and size of the cell so that the cell is kept from being separated during the wafer-level processes.

2. The method of claim 1, wherein in the forming of the cell edge processing portion, the cell edge processing portion is formed such that a cell from the sapphire wafer has a size L and a cell-to-cell spacing S, satisfying $0 \leq S \leq L$.

3. The method of claim 1, wherein after the forming of the etched portion, any one or two or more of a black matrix (BM) printed layer, an anti-reflective (AR) coating layer, and an anti-fingerprint (AF) coating layer are formed on the sapphire wafer.

4. The method of claim 1, wherein a cell size L and a thickness T of the sapphire wafer satisfy $10T \leq L \leq 250T$.

5. The method of claim 1, wherein the sapphire cover window manufactured thereby has a size of 30 mm or less, wherein the size of the sapphire cover window is a diameter if the cell from the sapphire wafer is circular and a diagonal length if the cell from the sapphire wafer is rectangular.

6. The method of claim 1, wherein in the forming of the cell edge processing portion, a picosecond laser or a femtosecond laser is used.

7. The method of claim 6, wherein the cell edge processing portion contains a modified portion formed along a cell edge by vertically transferring energy from the laser to the sapphire wafer.

8. The method of claim 7, wherein the modified portion is formed in a direction perpendicular to the sapphire wafer along the cell edge and contains a plurality of through holes that are spaced from each other by a distance in a range of 1 to 5 μm.

9. The method of claim 8, wherein the modified portion contains a crack formed around the through holes due to an impact spreading when forming the through holes.

10. The method of claim 1, wherein the etched portion on the sapphire wafer contains a gap formed along a cell edge between the cells from the sapphire wafer or along a cell edge between the cell from the sapphire wafer and a dummy.

11. The method of claim 10, wherein the gap contains a chamfer from the sapphire wafer having a predetermined depth from the surface of the cell from the sapphire wafer and a predetermined width from a side surface of the cell from the sapphire wafer.

12. The method of claim 11, wherein the chamfer has a depth that is 10% to 50% of a thickness of the sapphire wafer, and the chamfer has a width in a range of 1 to 50 μm.

* * * * *